US012711889B2

(12) United States Patent
Weber et al.

(10) Patent No.: US 12,711,889 B2
(45) Date of Patent: Aug. 18, 2026

(54) CONTROL OF THE IMAGE REPRODUCTION OF A DISPLAY APPARATUS

(71) Applicant: Continental Automotive GmbH, Hannover (DE)

(72) Inventors: Markus Weber, Mainz (DE); Torsten Lahr, Zornheim (DE); Oliver Jakoby, Heusenstamm (DE); Kai Hohmann, Babenhausen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 17/764,082

(22) PCT Filed: Feb. 12, 2020

(86) PCT No.: PCT/EP2020/053591
§ 371 (c)(1),
(2) Date: Mar. 25, 2022

(87) PCT Pub. No.: WO2021/058140
PCT Pub. Date: Apr. 1, 2021

(65) Prior Publication Data

US 2022/0375386 A1 Nov. 24, 2022

(30) Foreign Application Priority Data

Sep. 27, 2019 (DE) ..................... 10 2019 214 921.9

(51) Int. Cl.
*G09G 3/20* (2006.01)

(52) U.S. Cl.
CPC ... *G09G 3/2007* (2013.01); *G09G 2320/0271* (2013.01); *G09G 2320/028* (2013.01);
(Continued)

(58) Field of Classification Search
None
See application file for complete search history.

(56) References Cited

U.S. PATENT DOCUMENTS 10,957,247 B1 * 3/2021 Raynal ................. G09G 3/3225
2007/0252801 A1 11/2007 Park et al.
(Continued)

FOREIGN PATENT DOCUMENTS

CN 112154498 A 12/2020
DE 102016007814 A1 12/2017
(Continued)

OTHER PUBLICATIONS

Office Action dated Jul. 22, 2023 from corresponding Chinese patent application No. 202080065393.8.
(Continued)

*Primary Examiner* — Andre L Matthews
(74) *Attorney, Agent, or Firm* — COZEN O'CONNOR

(57) ABSTRACT

The present disclosure relates to a method, a computer program comprising instructions and an apparatus for controlling the image reproduction of a display apparatus. The disclosure furthermore relates to a display apparatus in which a method according to the disclosure is realized. In a first step, the display apparatus is switched from a first operating mode with emission into a large field of view to a second operating mode with emission into a restricted field of view. Moreover, parameters are acquired which influence a contrast of the image reproduction that is perceivable by an observer situated outside the restricted field of view. A contrast for the image reproduction is adapted on the basis of the acquired parameters. Optionally, the image reproduction of the display apparatus can be interrupted if an impermissible head position of the observer is ascertained.

12 Claims, 6 Drawing Sheets

(52) U.S. Cl.
CPC ............... *G09G 2320/0626* (2013.01); *G09G 2320/068* (2013.01); *G09G 2354/00* (2013.01); *G09G 2358/00* (2013.01); *G09G 2360/144* (2013.01)

(56) References Cited

U.S. PATENT DOCUMENTS

| | | | | |
|---|---|---|---|---|
| 2009/0267973 | A1 | 10/2009 | Lee | |
| 2010/0134527 | A1* | 6/2010 | Inada | G09G 3/3426 345/102 |
| 2011/0157209 | A1* | 6/2011 | Saito | G09G 3/20 345/589 |
| 2011/0273490 | A1 | 11/2011 | Shimazaki | |
| 2011/0317399 | A1* | 12/2011 | Hsu | G02F 1/1323 362/97.1 |
| 2012/0215403 | A1 | 8/2012 | Tengler et al. | |
| 2014/0085360 | A1* | 3/2014 | Ohno | G09G 3/36 345/694 |
| 2014/0160099 | A1 | 6/2014 | Li et al. | |
| 2017/0010407 | A1* | 1/2017 | Huang | G02B 6/0068 |
| 2017/0263208 | A1 | 9/2017 | Imai et al. | |
| 2018/0082068 | A1 | 3/2018 | Lancioni et al. | |
| 2019/0180664 | A1* | 6/2019 | Sun | G06F 21/84 |
| 2020/0003946 | A1* | 1/2020 | Klippstein | G02B 6/0073 |
| 2020/0110301 | A1* | 4/2020 | Harrold | G09G 3/3406 |
| 2021/0195714 | A1* | 6/2021 | Woodgate | G09G 3/20 |
| 2021/0232278 | A1 | 7/2021 | Heber et al. | |

FOREIGN PATENT DOCUMENTS

| | | | |
|---|---|---|---|
| JP | H10187127 | A | 7/1998 |
| JP | 2010015078 | A | 1/2010 |
| WO | 2010084678 | A1 | 7/2010 |
| WO | 2017089482 | A1 | 6/2017 |
| WO | 2018119161 | A1 | 6/2018 |
| WO | 2018187019 | A1 | 10/2018 |
| WO | 2019034557 | A1 | 2/2019 |

OTHER PUBLICATIONS

Office Action dated Aug. 28, 2023 from corresponding Korean patent application No. 10-2022-7009190.

Examination Report dated Dec. 12, 2024 from corresponding European patent application No. 20706644.0, the Examination Report and foreign references have been previously uploaded on May 23, 2025.

* cited by examiner

CONTROL OF THE IMAGE REPRODUCTION OF A DISPLAY APPARATUS

CROSS REFERENCE TO RELATED APPLICATIONS

This U.S. patent application claims the benefit of PCT patent application No. PCT/EP2020/053591 filed on Feb. 12, 2020, which claims the benefit of German patent application No. 10 2019 214 921.9, filed on Sep. 27, 2019, both of which are hereby incorporated by reference.

TECHNICAL FIELD

The present disclosure relates to a method, a computer program comprising instructions and an apparatus for controlling the image reproduction of a display apparatus. The disclosure furthermore relates to a display apparatus in which a method according to the disclosure is realized.

BACKGROUND

The number and area of display apparatuses in motor vehicles is constantly increasing. Display apparatuses can be found on the market for example as an instrument cluster for the driver, as a central display and also as a passenger display. To an increasing extent in this case a plurality of displays are being combined under a common surface, the so-called cover glass. Instrument clusters essentially display vehicle-specific data, such as e.g. speed, status information or else navigation indications. Central displays essentially display navigation maps, entertainment information or operating settings for air conditioning. Passenger displays are increasingly enabling the passenger to make use of comprehensive entertainment packages, such as e.g. watching videos or films.

While the driver is fulfilling his/her actual task, that of driving the vehicle, the passenger has the possibility of viewing an entertainment program on the passenger display. In this case, for safety reasons it must be ensured that the driver cannot be distracted by the entertainment program such as a video film, for example, at any time. Ideally it should even be ensured that the driver cannot discern any contents on the passenger display.

This can be implemented for example by means of a so-called privacy filter, also referred to as privacy film, louvered film or privacy screen. Such privacy filters are already being used for smartphones, notebooks or screens of automated teller machines. However, these static solutions have the disadvantage that the driver cannot view the display at any time and, consequently, even if the need arose, the passenger display cannot be used for displaying information intended for the driver. Therefore, a passenger display equipped with a privacy filter cannot be incorporated in a welcoming scenario in the motor vehicle, for example, during which all the displays of a display console are switched on in order to welcome the driver.

In an alternative approach, therefore, the privacy facility or the so-called privacy function is implemented in a switchable fashion. This can be effected by means of a switchable backlight, for example by two backlights being situated below the display. The first backlight is used when the privacy function is active and a restricted field of view must be ensured, whereas the second backlight is used when the privacy function is not active and a large field of view is intended to be attained. The switching is effected by way of the switching on and off of the corresponding illuminants, for example LEDs (LED: light emitting diode), of the respective backlight. In this case, the second backlight is arranged above the first backlight and the optical waveguide thereof is designed to be transparent, such that it is light-transmissive to the light emitted by the first backlight. The first backlight has the task of emitting light that is as focused as possible for the passenger. The second backlight has the task of emitting light which is visible to driver and passenger equally. By way of example, an optical waveguide of the second backlight has specific microstructures for coupling out light.

Against this background, WO 2018/187019 A1 describes a display with backlight which has two observer zones and two operating modes. A first region of the backlight emits directional light in the direction of a first observer zone. A second region of the backlight emits light with a wide angular range in the direction of the first and a second observer zone in a first operating mode. The display has a second backlight, which emits light with a wide angular range in the direction of both the first and the second observer zone in a second operating mode.

Furthermore, WO 2019/034557 A1 describes a screen which can be operated on at least one sub-area of its image area in at least two operating modes for a free viewing mode and for a restricted viewing mode, wherein the rest of the image area of the screen outside the sub-area permanently has a free viewing mode. The screen comprises a first backlight having a sheetlike extent, which emits light into a non-restricted angular range and which is substantially not arranged below said sub-area. The screen additionally comprises at least one second backlight having a sheetlike extent, which emits light into a restricted angular range and which is substantially arranged below said sub-area.

US 2018/0082068 A1 describes a method for a dynamic application of a privacy filter on an electronic display. The method involves firstly ascertaining that the data to be displayed on the electronic display are private. A location context for the electronic display is additionally determined. Boundaries of a region of the electronic display in which the private data are intended to be displayed are furthermore determined. Finally, a privacy filter is generated on the basis of the data, the location context and the boundaries. Said privacy filter is configured such that it restricts the viewing angle of the region of the electronic display in which the private data are intended to be displayed.

An analysis of prototypes having the construction outlined has revealed that, with the privacy function activated, the luminance for the driver's position decreases very greatly as desired, e.g. to <1% at 45° compared with a perpendicular viewing angle. This already represents a good result, but it has been found that, with the privacy function activated, image contents are still discernible to the driver despite the low luminance of the passenger display. This is undesirable from safety standpoints.

It is an object of the present disclosure to provide solutions for improved control of the image reproduction of a display apparatus with a switchable privacy facility.

SUMMARY

This object is achieved by means of a method for controlling the image reproduction of a display apparatus, by means of a computer program comprising instructions, by means of an apparatus for controlling the image reproduction of a display apparatus, and by means of a display apparatus.

According to one aspect, a method for controlling the image reproduction of a display apparatus comprises switching the display apparatus from a first operating mode with emission into a large field of view to a second operating mode with emission into a restricted field of view, acquiring parameters which influence a contrast of the image reproduction that is perceivable by an observer situated outside the restricted field of view, and adapting a contrast for the image reproduction on the basis of the acquired parameters.

In one embodiment of the method, the method further comprises a computer program that comprises instructions which, when executed by a computer, cause the computer to carry out the following steps for controlling the image reproduction of a display apparatus of switching the display apparatus from a first operating mode with emission into a large field of view to a second operating mode with emission into a restricted field of view, acquiring parameters which influence a contrast of the image reproduction that is perceivable by an observer situated outside the restricted field of view, and adapting a contrast for the image reproduction on the basis of the acquired parameters.

The term computer should be understood to include graphics chips, embedded systems and other processor-based data processing apparatuses.

The computer program can be provided for electronic retrieval or can be stored on a computer-readable storage medium, for example.

According to another aspect, an apparatus for controlling the image reproduction of a display apparatus comprises a switching unit for switching the display apparatus from a first operating mode with emission into a large field of view to a second operating mode with emission into a restricted field of view, an evaluation unit for acquiring parameters which influence a contrast of the image reproduction that is perceivable by an observer situated outside the restricted field of view, and a control unit for adapting a contrast for the image reproduction on the basis of the acquired parameters.

By virtue of the backlight-based concept described above, with the privacy function activated, the visible luminance of the passenger display is indeed greatly reduced for the driver, but there is also a further parameter that is important for readability: contrast. On account of the contrast, the passenger display still remains readable for the driver in many cases.

An optimization or a situation-dependent contrast setting or contrast reduction is used to further reduce the discernability of the image contents for the driver. The contrast for the image reproduction is adapted such that represented image contents are not discernible to the observer, i.e. the contrast perceived by the driver is close to 1. In this case, the adaptation of the contrast is effected in such a way that a sufficient contrast for the passenger is simultaneously present.

In principle, a reduction of the contrast at the driver's viewing angle can also be achieved by using a display technology of inferior quality, e.g. a liquid crystal display using twisted nematic technology (TN LCD: Twisted nematic liquid crystal display), in which the pixels are embodied as so-called twisted nematic cells. The disclosure optical quality of the image reproduction is not reduced and, in particular, a good performance is obtained even when the privacy function is not activated.

The parameters of a model or of a transformation for the adaptation of the image reproduction are determined individually on the basis of a series of factors. In the case of a passenger display in a motor vehicle, for example, the following factors can be taken into account: Position of the display, tilt angle or installation angle of the display, viewing angle of the driver, intrinsic display contrast of the display, luminance of the display, dimming range or luminance range of the display. The number and position of the sensors for acquiring the relevant parameters may also be taken into account. In this case, the parameters of the model or of the transformation may simultaneously be optimized to the effect of ensuring a homogeneous appearance for driver and passenger, even with varying seating positions.

In one embodiment of the method, adapting the contrast involves globally or locally modifying a luminance of a backlight or altering grayscale levels or colors of image contents to be represented. By brightening the background in relation to the information represented, it is possible to achieve the desired effect in a particularly simple manner. The adaptation of the luminance of the backlight may be effected either globally, i.e. for the entire display region, or locally in relation to adjacent regions. In particular, the gamma voltage settings may be changed in a situation-dependent manner for this purpose. As an alternative to the gamma voltage, the image content may also be altered directly, i.e. each pixel is mathematically calculated in a situation-dependent manner by means of a transformation. The transformation may be effected e.g. by applying an offset and a factor.

In one embodiment of the method, the acquired parameters relate to ambient conditions of the display apparatus, settings of the display apparatus, a head position of the observer or image contents to be represented. The parameters with respect to the ambient conditions of the display apparatus may comprise at least one ambient brightness. The parameters with respect to the settings of the display apparatus may comprise at least one brightness of a backlight. The parameters with respect to the image contents to be represented may comprise at least one brightness or color of the image contents or motion information for the image contents. The perceived contrast is essentially a function of the characteristic of the display used, the brightness of the backlight, the reflected light or the ambient light and also the image contents, i.e. the circumstance of whether the image contents are bright or dark.

The ambient brightness may be determined directly at the display or by means of brightness sensors present in the vehicle. A brightness value set for the display may be directly calculated from the brightness sensors in a microcontroller of a control device for the display or be received via an external source.

Knowledge of the head position of the driver or observer may be advantageous if the control algorithm is optimized directly for the head position, since the driver's viewing angle toward the display likewise influences the perceived luminance and the contrast.

In one embodiment of the method, the contrast is adapted differently for moving image contents and unmoving image contents. Different characteristics are defined for different applications. Since the human eye is trained to recognize movements, it may be advantageous to reduce the contrast for moving contents, such as e.g. dynamic videos, to a greater extent than for static contents, such as e.g. static menus.

In one embodiment of the method, adapting the contrast is effected by a driver of the display apparatus, by a graphics chip or by a graphics controller. The graphics chip can be realized for example as an ASIC (ASIC: Application-specific integrated circuit) or as an FPGA (FPGA: Field programmable gate array). Both the abovementioned adaptation of the gamma voltage and the adaptation of the image contents can be performed by various components of a display apparatus, e.g. by a display driver, a graphics controller or a graphics chip. Which approach is implemented in a display apparatus is at the discretion of the person skilled in the art here. The adaptation of the image contents can also be effected by means of an optimization of the coloration depending on ambient parameters.

In one embodiment of the method, the image reproduction of the display apparatus is interrupted if an impermissible head position of the observer is ascertained. The evaluation of the head position of the driver can be used as an additional safety criterion, by recognizing whether the driver is moving from the normal head position, or head position taken into account by the system, in order to look at the passenger display. In this special case, the passenger display can then be switched off, for example, with the result that misuse, too, is always recognized and dealt with.

An embodiment of the method or an apparatus according to the disclosure is used in a display apparatus. By way of example, such a display apparatus may be used in a motor vehicle, in particular as a passenger display, but likewise in other vehicle displays. It goes without saying that applications in other fields are also possible, e.g. in consumer electronics, in aviation, in trains, in medical technology, etc. One possible application concerns points of sale, for example, where for instance the PIN entry takes place on a screen with the privacy function activated, while the preceding buying or consultation process takes place in the unprotected mode, such that a number of persons can follow it.

Further features of the present disclosure will become apparent upon consideration of the detailed description and the attached drawings wherein like numerals designate like structures throughout the specification.

DETAILED DESCRIPTION

For a better understanding of the principles of the present disclosure, embodiments of the disclosure will be explained below in more detail with reference to the figures.

The same reference signs are used in the figures for identical or functionally identical elements and are not necessarily described again for each figure. It goes without saying that the disclosure is not restricted to the illustrated embodiments and that the described features can also be combined or modified without departing from the scope of protection of the invention as defined in the appended claims.

Figure 1:
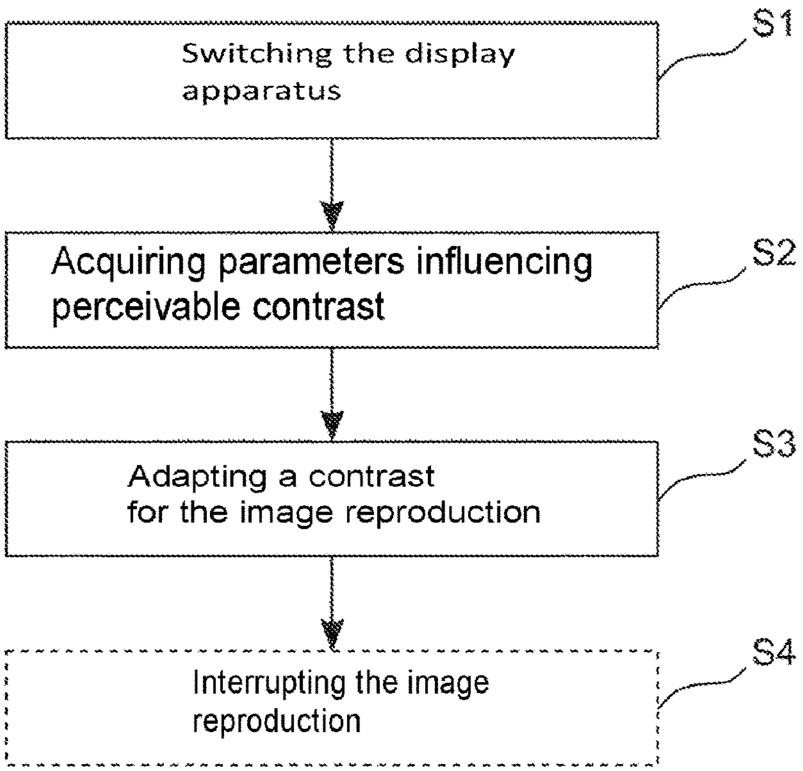
FIG. 1 schematically shows a method for controlling the image reproduction of a display apparatus.

FIG. 1 schematically shows a method for controlling the image reproduction of a display apparatus. In a first step S1, the display apparatus is switched from a first operating mode with emission into a large field of view to a second operating mode with emission into a restricted field of view. Moreover, parameters are acquired S2 which influence a contrast of the image reproduction that is perceivable by an observer situated outside the restricted field of view. The parameters may relate for example to ambient conditions of the display apparatus, such as an ambient brightness, settings of the display apparatus such as a brightness of a backlight, a head position of the observer or image contents to be represented, such as a brightness or color of the image contents or motion information for the image contents. A contrast for the image reproduction is adapted S3 on the basis of the acquired parameters. The contrast is adapted S3 here such that represented image contents are not discernible to the observer. For this purpose, for example, a luminance of a background may be modified or image contents to be represented can be altered. In this case, provision may be made for the contrast to be adapted S3 differently for moving image contents and unmoving image contents. Optionally, the image reproduction of the display apparatus may be interrupted S4 if an impermissible head position of the observer is ascertained.

Figure 2:
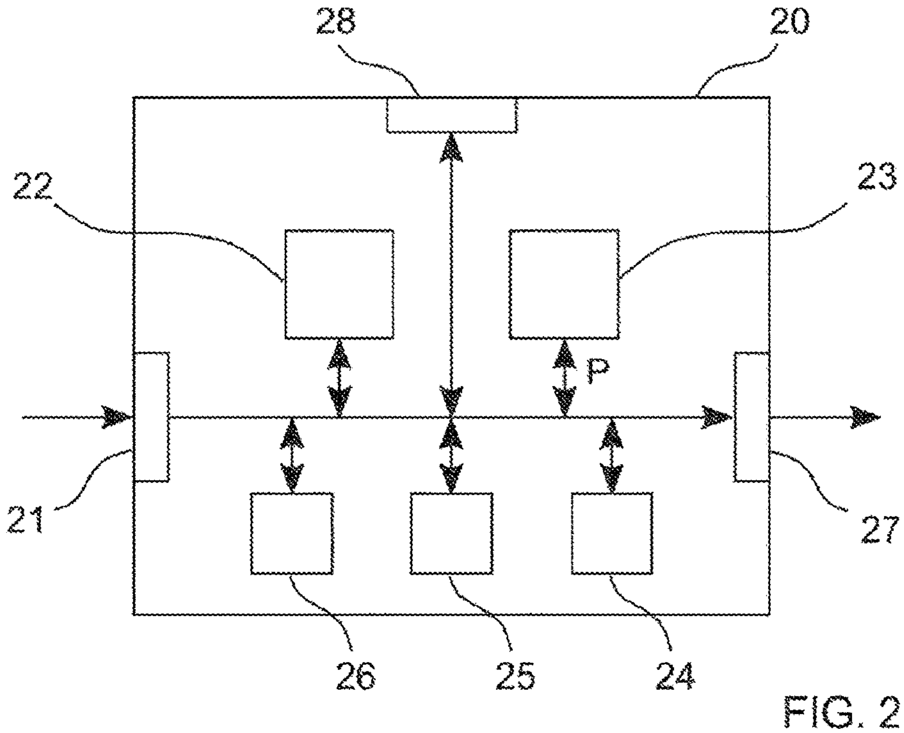
FIG. 2 schematically shows a first embodiment of an apparatus for controlling the image reproduction of a display apparatus.

FIG. 2 shows a simplified schematic illustration of a first embodiment of an apparatus 20 for controlling the image reproduction of a display apparatus. The apparatus 20 has an input 21, via which sensor data can be received. A switching unit 22 is configured to switch the display apparatus from a first operating mode with emission into a large field of view to a second operating mode with emission into a restricted field of view. An evaluation unit 23 acquires parameters P which influence a contrast of the image reproduction that is perceivable by an observer situated outside the restricted field of view. The parameters P may relate for example to ambient conditions of the display apparatus, such as an ambient brightness, settings of the display apparatus such as a brightness of a backlight, a head position of the observer or image contents to be represented, such as a brightness or color of the image contents or motion information for the image contents. For this purpose, the evaluation unit 23 can evaluate the received sensor data, in particular. On the basis of the acquired parameters P, a control unit 24 adapts a contrast for the image reproduction. The contrast is adapted here such that represented image contents are not discernible to the observer. For this purpose, for example, a luminance of a background may be modified or image contents to be represented may be altered. In this case, provision may be made for the contrast to be adapted differently for moving image contents and unmoving image contents. Via an output 27 of the apparatus 20, the data generated by the control unit 24 may be provided for a further use. Optionally, the image reproduction of the display apparatus may be interrupted by the apparatus 20 if an impermissible head position of the observer is ascertained.

The switching unit 22, the evaluation unit 23 and the control unit 24 may be controlled by a supervisory unit 25. Optionally, settings of the switching unit 22, of the evaluation unit 23, of the control unit 24 or of the supervisory unit 25 may be changed via a user interface 28. The data that arise in the apparatus 20 may be stored, if necessary, in a memory 26 of the apparatus 20, for example for a later evaluation or for a use by the components of the apparatus 20. The switching unit 22, the evaluation unit 23, the control unit 24 and the supervisory unit 25 may be realized as dedicated hardware, for example as integrated circuits. However, they may of course also be implemented partly or fully in combination or as software that runs on a suitable processor, for example on a GPU or a CPU. The input 21 and the output 27 may be implemented as separate interfaces or as a combined bidirectional interface.

Figure 3:
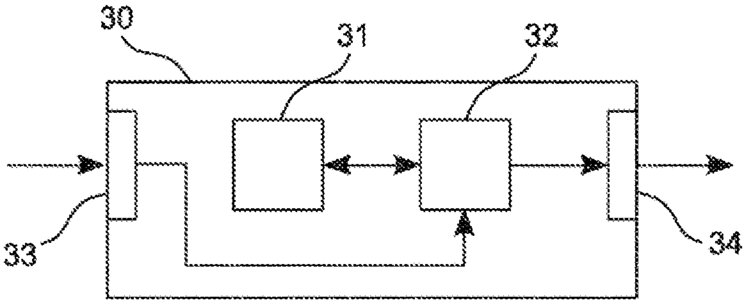
FIG. 3 schematically shows a second embodiment of an apparatus for controlling the image reproduction of a display apparatus.

FIG. 3 shows a simplified schematic illustration of a second embodiment of an apparatus 30 for controlling the image reproduction of a display apparatus. The apparatus 30 has a processor 32 and a memory 31. The apparatus 30 is a computer or a graphics chip, for example. Instructions which, when executed by the processor 32, cause the apparatus 30 to carry out the steps in accordance with any of the methods described are stored in the memory 31. The instructions stored in the memory 31 thus embody a program which is executable by the processor 32 and which realizes the method according to the invention. The apparatus 30 has an input 33 for receiving information, in particular information concerning a locally acquired ambient brightness. Data generated by the processor 32 are provided via an output 34. Furthermore, said data can be stored in the memory 31. The input 33 and the output 34 may be combined to form a bidirectional interface.

The processor 32 may comprise one or more processor units, for example microprocessors, digital signal processors or combinations thereof.

The memories 26, 31 of the described apparatuses may have both volatile and non-volatile memory areas and may comprise a wide variety of storage devices and storage media, for example hard disks, optical storage media or semiconductor memories.

Figure 4:
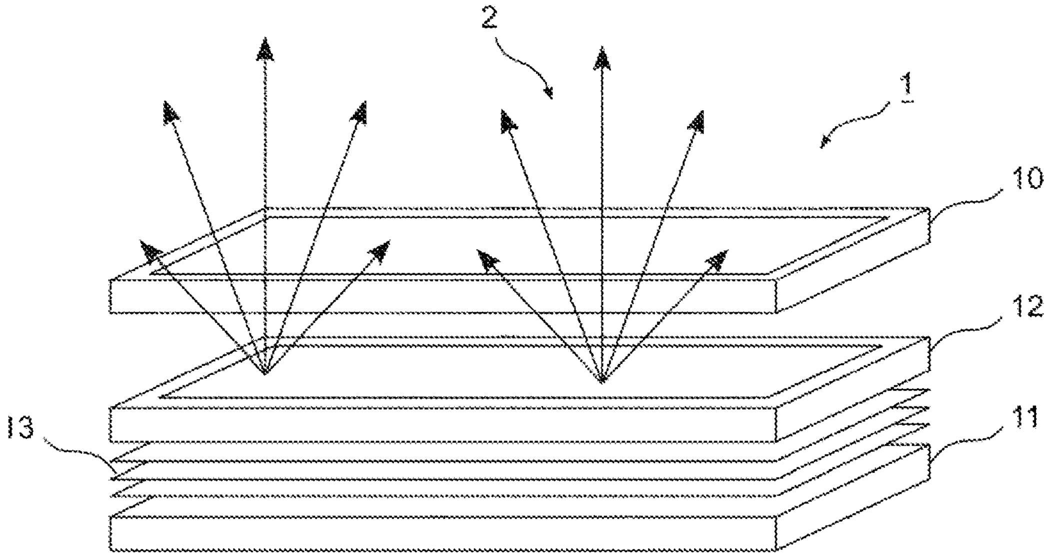
FIG. 4 schematically shows a display apparatus with the privacy function not activated.

FIG. 4 shows a display apparatus 1 according to the invention with the privacy function not activated. A display panel 10, a first backlight 11 and a second backlight 12 are evident. A plurality of films 13 are arranged between the first backlight 11 and the second backlight 12. The display panel 10 is a liquid crystal element, for example. The large angular range 2 in which the second backlight 12 emits light is furthermore evident. In this case, the direction of the arrows indicates the direction of the emitted light, and the length indicates the respective intensity of said light. The reference signs are also used in the text hereinafter for identical elements or elements having an identical function. Identical elements or functionally identical elements are described once again hereinafter only insofar as appears necessary in order to afford an understanding.

Figure 5:
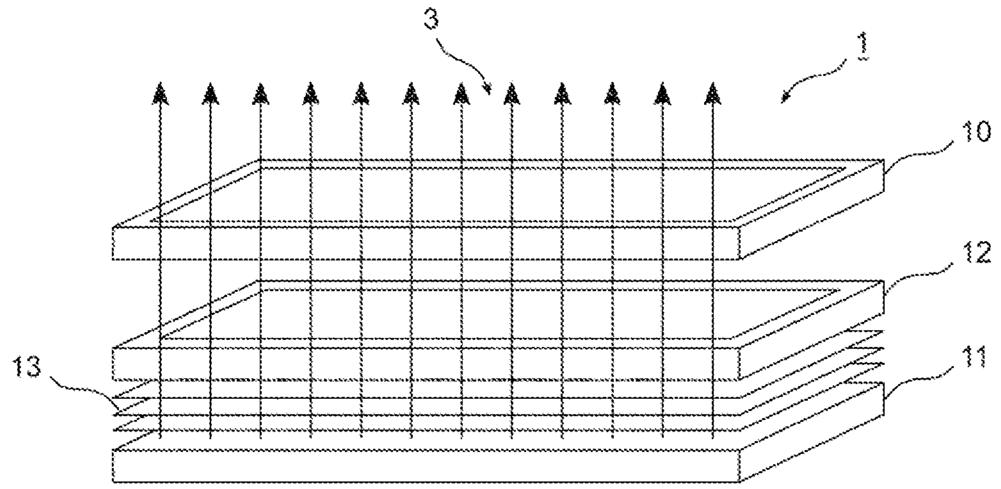
FIG. 5 schematically shows a display apparatus with the privacy function activated.

FIG. 5 shows a display apparatus 1 according to the invention with the privacy function activated. In this case, the first backlight 11 is active instead of the second backlight 12. Said first backlight emits light in a very narrow angular range 3 having almost exclusively one direction.

Figure 6:
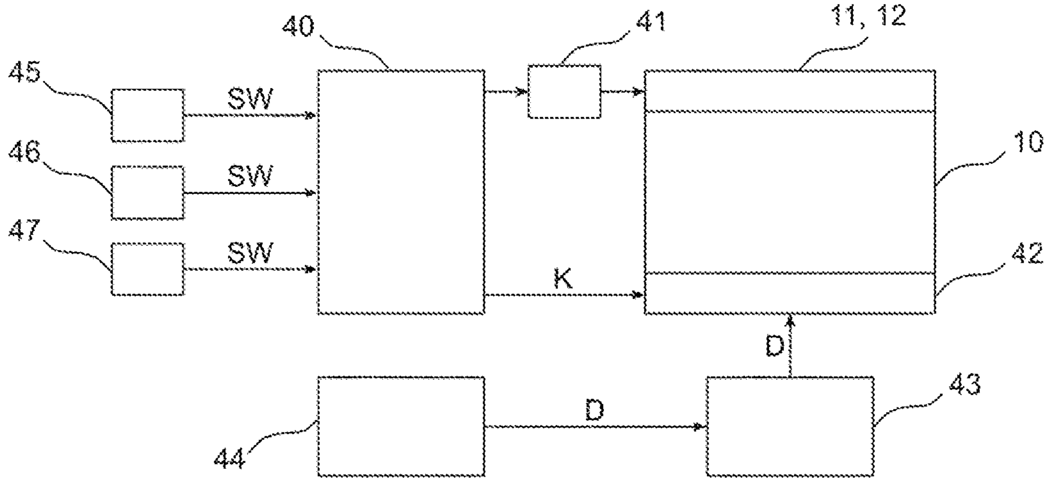
FIG. 6 shows a block diagram of an embodiment in which the adaptation of the contrast is effected by way of a display driver.

FIG. 6 shows a block diagram of an embodiment in which the adaptation of the contrast is effected by way of a display driver 42. By way of example, a sensor 45 for the ambient light, a source 46 for the brightness value of the display 10, e.g. a sensor or an input value provided by the display, and a sensor 47 for the head position of the driver are provided. Their measured values or sensor values SW are fed to a microcontroller 40. At one output, said microcontroller controls a driver 41 for the LED backlight 11, 12. Via a further output, a stipulation for the contrast adaptation K is output to the display driver 42. The latter receives data D to be represented from a graphics chip 43, e.g. a timing controller, which receives unprocessed image information from a graphics controller 44 and conditions it for the display driver 42. The graphics chip 43 may be realized as an ASIC or an FPGA, for example.

Figure 7:
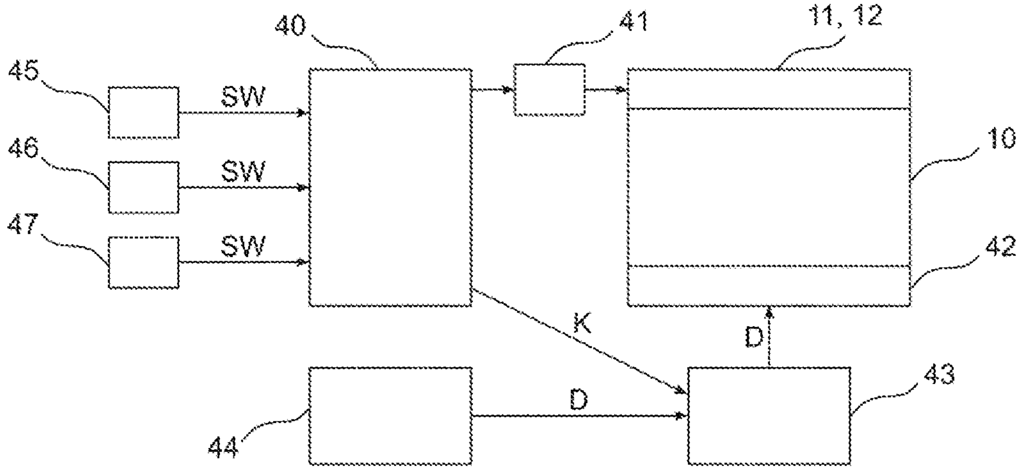
FIG. 7 shows a block diagram of an embodiment in which the adaptation of the contrast is effected by way of a graphics ASIC.

FIG. 7 shows a block diagram of an embodiment in which the adaptation of the contrast is effected by way of the graphics chip 43 instead of by way of the display driver 42 as described in FIG. 6.

Figure 8:
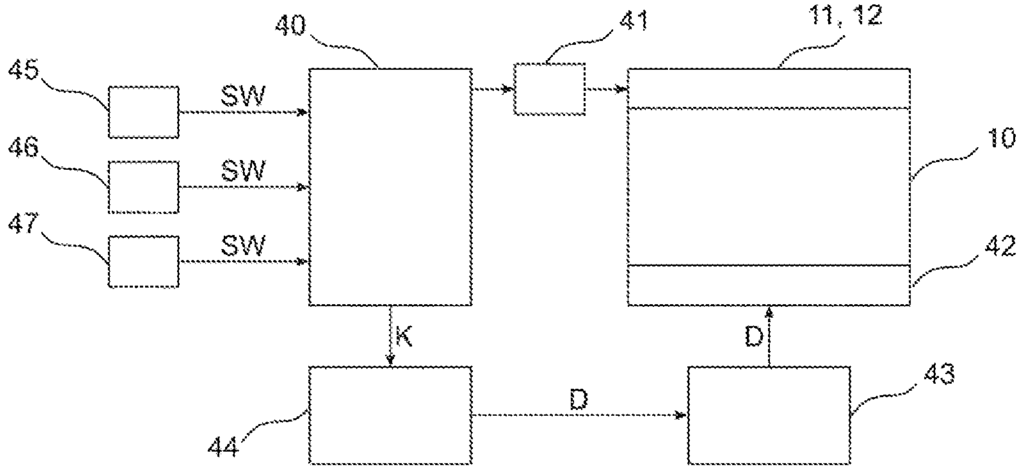
FIG. 8 shows a block diagram of an embodiment in which the adaptation of the contrast is effected by way of a graphics controller.

FIG. 8 shows a block diagram of an embodiment in which the adaptation of the contrast is effected by way of the graphics controller 44 instead of by way of the display driver 42 as described in FIG. 6.

Figure 9:
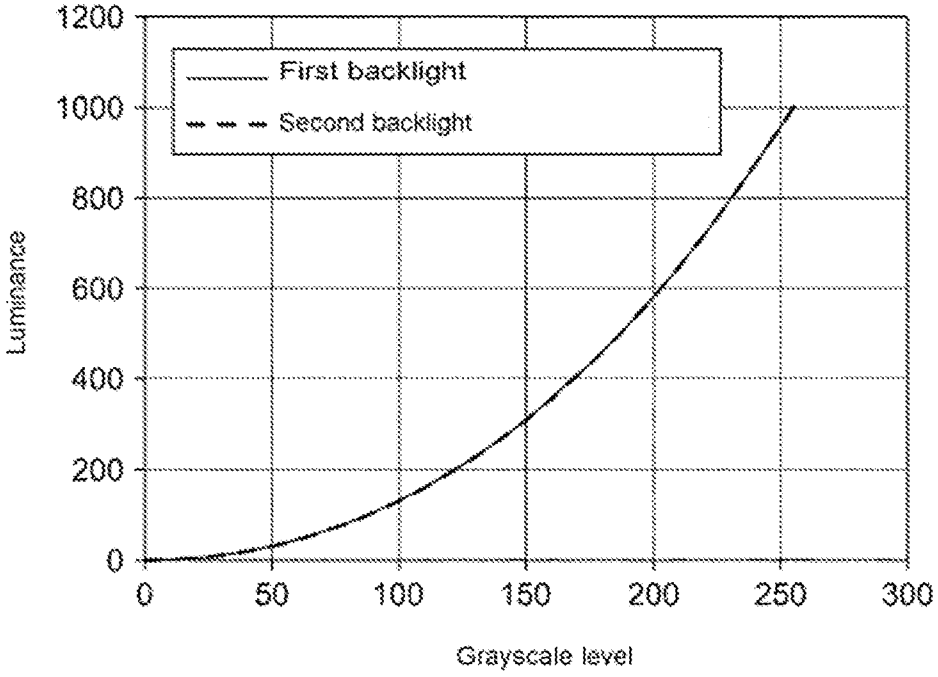
FIG. 9 shows a first realization of a gamma voltage that is situation-dependent or dependent on the operating mode.

FIG. 9 shows a first realization of a gamma voltage that is situation-dependent or dependent on the operating mode. In this case, the horizontal axis indicates grayscale levels in relative units, and the vertical axis indicates the luminance in relative units. The gamma voltage settings are chosen identically here for the first backlight and the second backlight. It is evident that the curves for the two backlights coincide.

Figure 10:
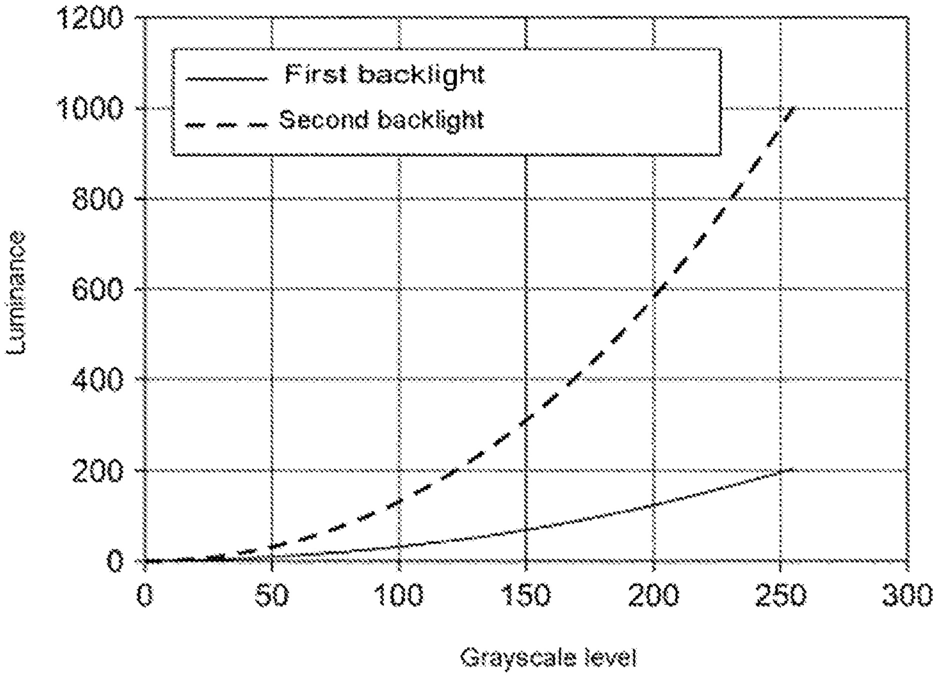
FIG. 10 shows a second realization of a gamma voltage that is situation-dependent or dependent on the operating mode.

FIG. 10 shows a second realization of a gamma voltage that is situation-dependent or dependent on the operating mode. In this case, the horizontal axis indicates grayscale levels in relative units, and the vertical axis indicates the luminance in relative units. The gamma voltage settings are chosen differently here for the first backlight and the second backlight. It is evident that the curve for the first backlight is far below that for the second backlight, particularly at high values of the grays cale levels.

Figure 11:
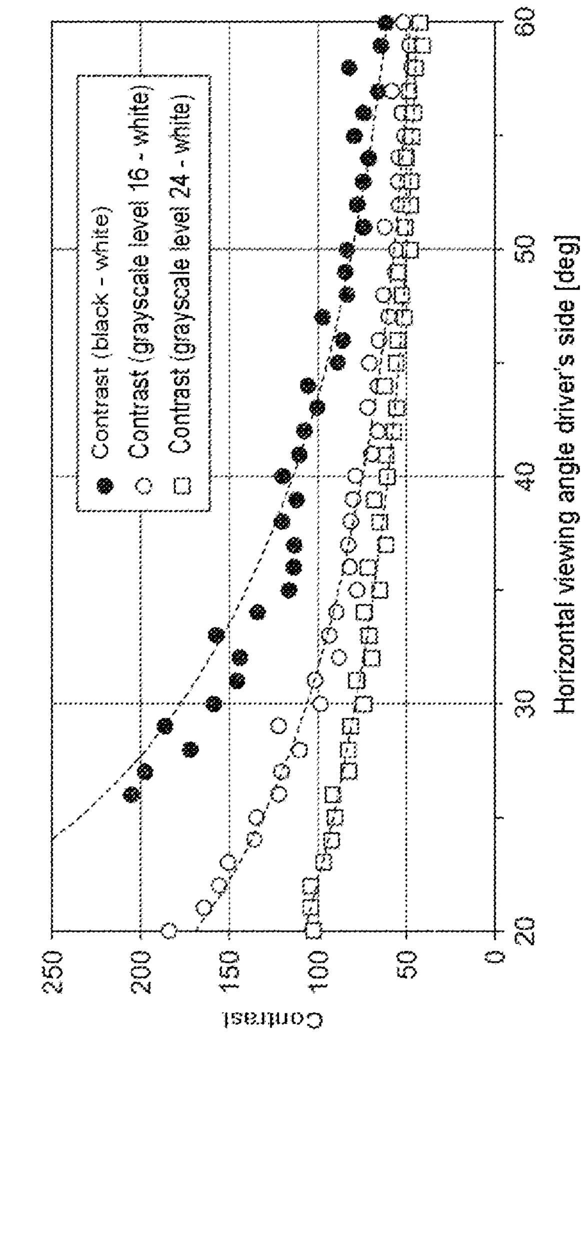
FIG. 11 shows measured values for the contrast as a function of the horizontal viewing angle.

FIG. 11 shows measured values for the contrast in relative units with the privacy function activated, plotted against the horizontal viewing angle in degrees toward the driver's side. The upper measured values show the contrast between black and white, the middle measured values show the contrast between grayscale level 16 and white, and the lower measured values show the contrast between grayscale level 24 and white. The low contrast desired is evident particularly at angles of greater than approximately 40°.

The invention claimed is:

1. A method for controlling image reproduction of a display apparatus, comprising:

switching the display apparatus from a first operating mode with emission into a large field of view to a second operating mode with emission into a restricted field of view;

acquiring parameters which influence a contrast of the image reproduction that is perceivable by an observer situated outside the restricted field of view;

wherein the acquired parameters relate to image contents to be represented, wherein the parameters with respect to the image contents to be represented comprise motion information for the image contents; and adapting a contrast for the image reproduction on the basis of the acquired parameters, wherein adapting the contrast involves globally or locally altering grayscale levels to be represented, wherein a luminance of a backlight of the display apparatus is modified for adjusting the contrast or wherein gamma voltage settings are modified for adjusting the contrast, wherein the contrast is adapted differently for moving image contents and unmoving image contents, and wherein the contrast for the image reproduction is adapted such that represented image contents are not discernable to the observer situated outside the restricted filed of view and that at the same time a sufficient contrast for the observer situated inside the restricted filed of view is simultaneously present, wherein the switching the display apparatus from the first operating mode with emission into the large field of view to the second operating mode with emission into the restricted field of view further comprises switching between a first backlight that provides the first operating mode and a second backlight that provides the second operating mode, wherein the first and second backlights overlap.

2. The method as claimed in claim 1, wherein adapting the contrast is effected by a driver of the display apparatus, by a graphics chip or by a graphics controller.

3. The method as claimed in claim 1, the method further comprising executing instructions of a computer program to control the image reproduction of the display apparatus.

4. The method as claimed in claim 1, wherein acquired parameters relate to ambient conditions of the display apparatus.

5. The method as claimed in claim 4, wherein the ambient conditions comprise at least one ambient brightness.

6. The method as claimed in claim 1, wherein acquired parameters relate to the settings of the display apparatus.

7. The method as claimed in claim 6, wherein the settings of the display apparatus comprise at least one brightness of a backlight.

8. The method claimed in claim 1, wherein acquired parameters relate to a head position of the observer.

9. The method as claimed in claim 8, wherein the image reproduction of the display apparatus is interrupted if an impermissible head position of the observer is ascertained.

10. The method as claimed in claim 1, wherein parameters with respect to the image contents to be represented comprise at least one brightness.

11. The method as claimed in claim 10, wherein the parameters with respect to the image contents to be represented comprise color of the image contents.

12. An apparatus for controlling the image reproduction of a display apparatus in a vehicle comprising:

a switching unit for switching the display apparatus from a first operating mode with emission into a large field of view to a second operating mode with emission into a restricted field of view;

an evaluation unit for acquiring parameters which influence a contrast of the image reproduction that is perceivable by an observer situated outside the restricted field of view, wherein the acquired parameters relate to image contents to be represented, wherein the parameters with respect to the image contents to be represented comprise motion information for the image contents;

a control unit for adapting a contrast for the image reproduction on the basis of the acquired parameters, wherein adapting the contrast involves globally or locally altering grayscale levels to be represented, wherein the control unit modifies a luminance of a backlight of the display apparatus in order to adjust the contrast or wherein the control unit modifies gamma voltage settings in order to adjust contrast, wherein the contrast is adapted differently for moving image contents and unmoving image contents, and wherein the contrast for the image reproduction is adapted such that represented image contents are not discernable to the observer situated outside the restricted filed of view and that at the same time a sufficient contrast for the observer situated inside the restricted filed of view is simultaneously present; and a first backlight that provides the first operating mode and a second backlight that provides the second operating mode, wherein the first and second backlights overlap.

* * * * *